United States Patent [19]

Koch et al.

[11] Patent Number: 5,681,988

[45] Date of Patent: Oct. 28, 1997

[54] APPARATUS FOR INDICATING THE DEGREE OF DIRTINESS OF A FILTER

[75] Inventors: Volker Koch, Stuttgart; Werner Schnabel, Ravenstein, both of Germany

[73] Assignee: Filterwerk Mann & Hummel GmbH, Ludwigsburg, Germany

[21] Appl. No.: 512,905

[22] Filed: Aug. 9, 1995

[30] Foreign Application Priority Data

Aug. 23, 1994 [DE] Germany .............. 9413558 U

[51] Int. Cl.$^6$ .............. B01D 35/143; G01M 15/00
[52] U.S. Cl. .............. 73/118.1; 73/38; 73/118.2; 340/607; 340/451
[58] Field of Search .............. 73/118.1, 38, 118.2; 340/607, 451

[56] References Cited

U.S. PATENT DOCUMENTS

| | | | |
|---|---|---|---|
| 3,033,030 | 5/1962 | Heller | 73/118.1 |
| 3,246,624 | 4/1966 | Lowther | 73/118.1 |
| 3,258,960 | 7/1966 | Baden et al. | 73/118.1 |
| 3,663,811 | 5/1972 | Voelz | 73/118.1 |
| 4,492,079 | 1/1985 | Takagi et al. | 73/38 |
| 5,036,698 | 8/1991 | Conti | 73/38 |
| 5,070,846 | 12/1991 | Dudek et al. | 73/118.2 |
| 5,270,935 | 12/1993 | Dudek et al. | 73/118.2 |
| 5,373,733 | 12/1994 | Fuchs et al. | 73/118.1 |
| 5,417,101 | 5/1995 | Weich | 73/38 |
| 5,477,731 | 12/1995 | Mouton | 73/38 |

FOREIGN PATENT DOCUMENTS

| | | |
|---|---|---|
| 3921013 | 1/1991 | Germany . |
| 4315577 | 12/1993 | Germany . |
| 4244721 | 2/1994 | Germany . |

*Primary Examiner*—George M. Dombroske
*Attorney, Agent, or Firm*—Evenson, McKeown, Edwards & Lenahan P.L.L.C.

[57] ABSTRACT

An apparatus for indicating the extent to which an air filter in an internal combustion engine is fouled. For this purpose the apparatus includes a pressure sensor, a sensor to detect the rotational speed of the engine, and an additional sensor which determines the load state of the engine. The signals of the three sensors are combined and serve to produce an air filter dirtiness indicating signal.

9 Claims, 2 Drawing Sheets

APPARATUS FOR INDICATING THE DEGREE OF DIRTINESS OF A FILTER

BACKGROUND OF THE INVENTION

This invention relates to an apparatus for indicating the degree of dirtiness of a filter, especially an air filter of an internal combustion engine.

In the past, motor vehicles filters, especially air filters, have not been monitored to determine their dirtiness. Instead, filters are changed according to certain maintenance specifications of the manufacturer, such as distance travelled or set time intervals. The specifications are selected so as to assure that even under severe operating conditions, such as extremely dusty conditions, the filter will be changed in due time. This means that the filter may be changed more often than would be required if the filter were changed based upon its degree of dirtiness.

Uhl, German Patent No. DE 4,224,721 discloses an apparatus which compares a pressure differential signal with a rotary speed signal to attempt to determine the extent of dirtiness of the filter. For this purpose a differential pressure sensor, particularly a U-tube pressure gauge, is provided, and the rotatory speed of the engine is detected by a speed sensor.

A disadvantage of the known apparatus is its limited manner of operation. For example, in an engine with a turbocharger, a correct measurement of differential pressure is very difficult or impossible, since the turbo charge pressure falsifies the differential pressure measurement. Also, the rotational speed signal alone is not sufficient to indicate the state of the engine or how the engine is operating.

SUMMARY OF THE INVENTION

An object of the present invention is to provide an apparatus which provides a reliable indication of the degree of dirtiness of an air filter.

This object has been achieved by providing an apparatus which combines sensed signals of the pressure on the clean side of the filter, the rotary speed of the engine, and the load on the engine, to determine and indicate the degree of dirtiness of the filter.

A so-called MANN maintenance switch, which is disclosed in the Mann & Hummel publication VKD 7040.3, has proven useful for detecting the pressure on the clean side of a filter. Of course, other kinds of maintenance switches may also be used to sense this pressure.

A number of sensors are known for detecting the rotary speed of an engine. Usually the rotatory speed of a motor vehicle engine is detected by the engine control technology. This speed signal may be used by the present invention to determine the dirtiness indicator signal.

The load on the engine can be sensed, for example, from the position of the gas pedal. The position of the gas pedal in more recent vehicles is detected electronically so that this signal is available. These three signals are combined to form an indicator signal which corresponds to the dirtiness of the filter.

An advantage of the present invention in using these three signals is that measurement of the degree of dirtiness of the filter does not have to be performed in the full-load region but can be performed even in the part-load region. In one advantageous embodiment of the present invention, digital sensors are used to measure the three signals. These digital sensors are advantageous due to their substantially simpler construction than analog sensors.

According to another advantageous embodiment of the invention, the pressure sensor is adjustable. Thus, the apparatus may be adapted to engines of different size and power.

In another embodiment of the present invention, an electronic circuit in the form of an EPROM is used as the combining circuit for the apparatus. This EPROM can be integrated into the electronic engine controls.

To improve the performance of the dirtiness indicator an iteration can be performed. To project the value measured in the partial-load region to the full load region, an extrapolation of the measured value may be performed. Thus, a measurement from the partial-load region can be used to determine whether the air throughput would be reduced at full load due to the dirtiness of the filter.

These and additional features of preferred embodiments of the invention are found in the specification and the drawings. It is to be understood that the individual features may be implemented separately or in combination, and may represent advantageous as well as separately patentable constructions.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
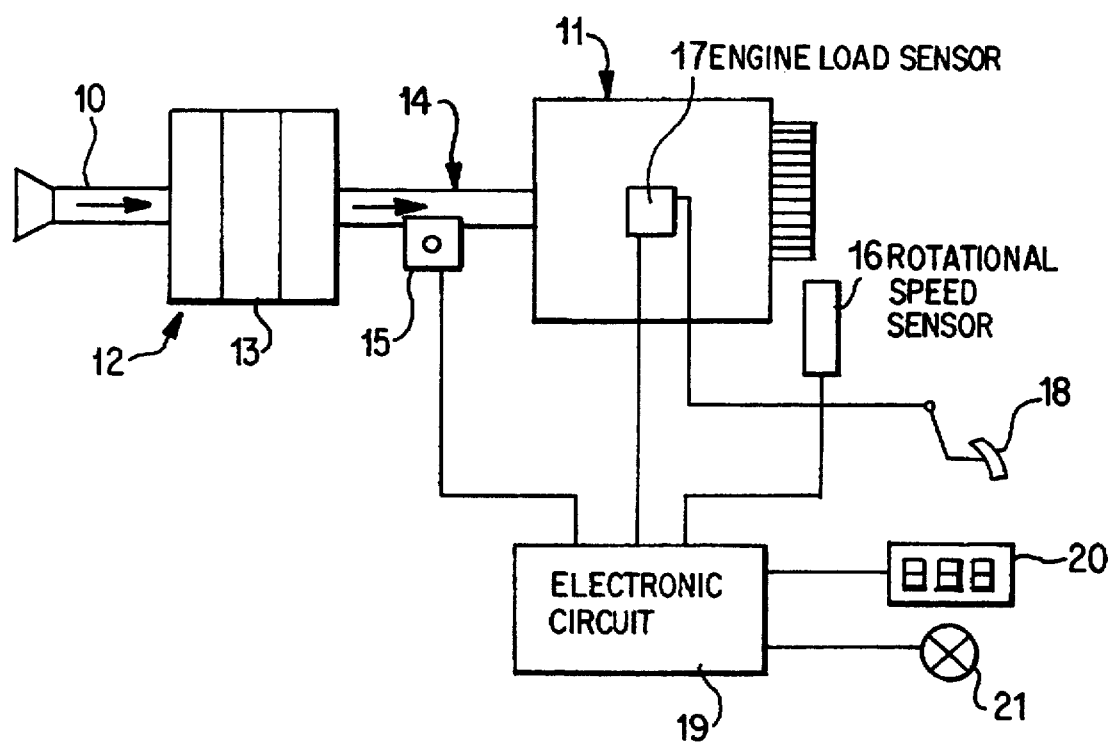
FIG. 1 is a diagrammatical representation of an apparatus for indicating the degree of dirtiness of a filter.

In an air intake duct 10 of an internal combustion engine 11 a filter housing 12 is disposed. In this filter housing there is a filter 13 for example a pleated flat filter element. The air cleaned by the filter is delivered through the air intake manifold 14 to the internal combustion engine.

A total of three sensors are provided. One pressure sensor 15 is disposed on the air intake line on the clean air side of the filter, a rotational speed sensor 16 is disposed on the engine and detects the engine's speed, and a sensor 17 for detecting the engine load senses for example the distance of movement of the gas pedal 18. Of course, the load state of the engine can also be detected by other means, including for example the engine electronic control system.

Figure 2:
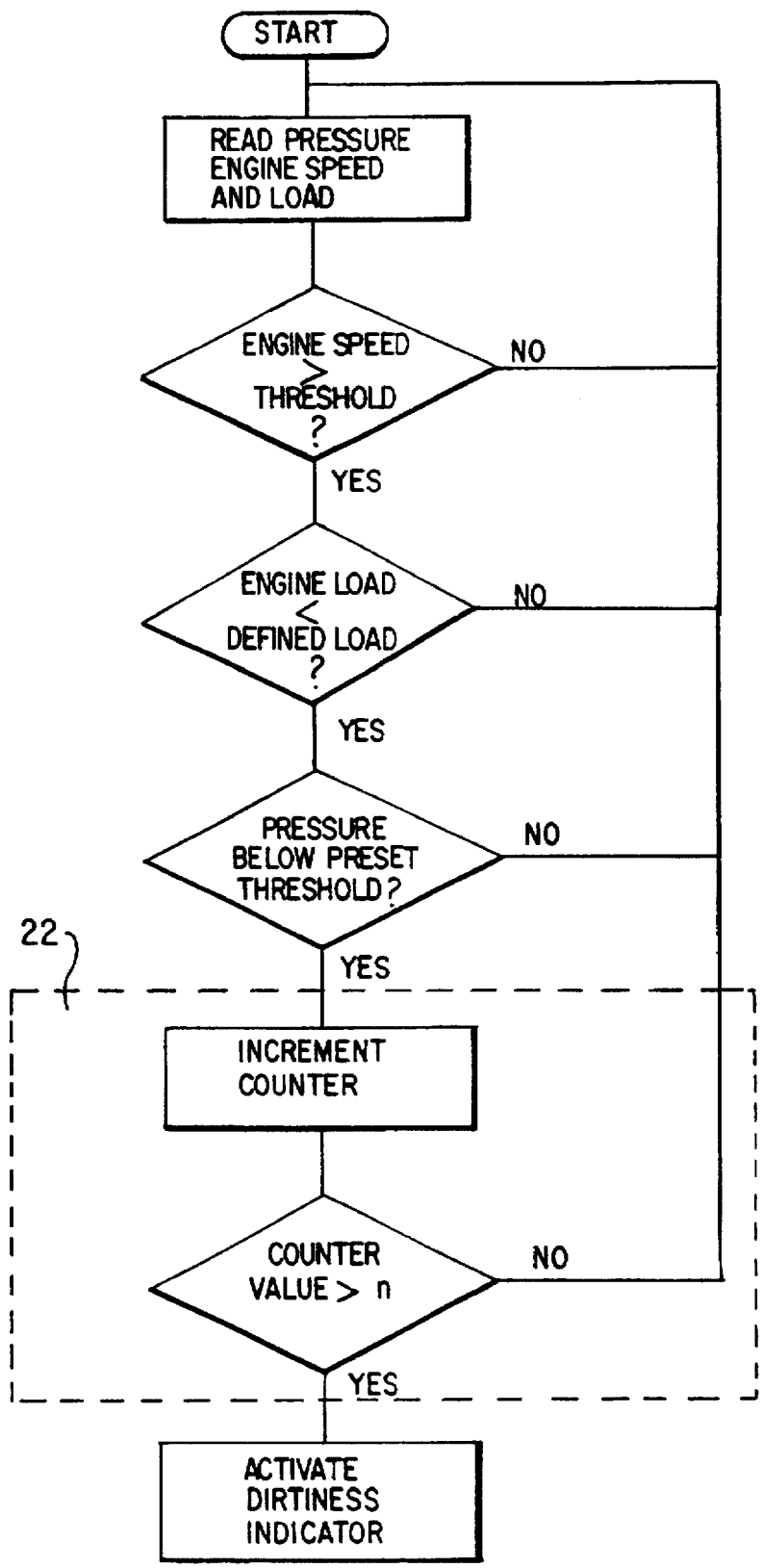
FIG. 2 is a logic diagram indication one way the sensor signals may be combined to activate a filter dirtiness indicator.

The signals produced by the three sensors are fed to an electronic circuit 19, such as an EPROM, programmed, for example, as illustrated in FIG. 2. This electronic circuit combines the sensor signals in a simple manner and produces a signal on a display 20 or on a warning light 21 whenever a vacuum above the preset threshold value of the pressure switch is present, beginning at a specific rotatory speed and below a defined engine load.

Thus, the sensor signals could produce the output signal via an AND link in the simplest manner. The pressure sensor 15 for determining the vacuum is adjustable. Thus it is possible to adapt the entire system to different engine characteristics. Neither the limit speed nor the limit load would have to be set very high. In this way it is possible to reliably determine the degree to which the filter is clogged, even under a mid-range load such as in a vehicle which is driven in a manner which only rarely reaches the middle range of the engine load.

If desired, the electronic circuit 19 may include an optional iteration circuit 22 which counts the number of occurrences when the dirtiness signal is produced and which triggers the indicator signal after a certain number of occurrences.

The present invention may further base the dirtiness indicator signal upon the additional factor of the distance driven by the vehicle. This distance may be determined in a known way and tied in with the data referred to above to determine the dirtiness indicator signal.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for indicating the degree of dirtiness of an air filter of an internal combustion engine, comprising a sensor which detects air pressure downstream of the filter, a sensor which detects engine speed, a sensor which detects engine load, and means for combining signals emitted by said sensors to yield a filter dirtiness indicator signal, wherein said signal combining means is an electronic circuit which comprises an EPROM programmed to produce said dirtiness indicator signal when the pressure sensor detects a pressure below a pressure threshold value, the engine speed sensor detects an engine speed above an engine speed threshold value, and the engine load sensor detects an engine load below an engine load threshold value.

2. An apparatus according to claim 1, wherein the electronic circuits includes an iteration circuit which counts the number of occurrences when said dirtiness indicator signal is produced and which triggers a dirtiness indicator after a selected number of said occurrences.

3. An apparatus for indicating the degree of dirtiness of an air filter of an internal combustion engine, comprising a sensor which detects air pressure downstream of the filter, a sensor which detects engine speed, a sensor which detects engine load, and an electronic circuit for combining signals emitted by said sensors to produce a filter dirtiness indicator signal, wherein each of the sensors produces a signal when the internal combustion engine is under partial load, and the electronic circuit comprises an extrapolation circuit which determines a reduction of air throughput through the filter at full load due to dirtiness of the filter.

4. An apparatus for indicating the degree of dirtiness of an air filter of an internal combustion engine, comprising a sensor which detects air pressure downstream of the filter, a sensor which detects engine speed, a sensor which detects engine load, and means for combining signals emitted by said sensors to produce a filter dirtiness indicator signal when the pressure sensor detects a pressure below a pressure threshold value, the engine speed sensor detects an engine speed above an engine speed threshold value, and the engine load sensor detects an engine load below an engine load threshold value.

5. An apparatus according to claim 4, wherein at least one of the pressure sensor, the engine speed sensor and the engine load sensor produces a digital signal.

6. An apparatus according to claim 4 wherein the threshold pressure value is adjustable.

7. An apparatus according to claim 4, wherein said signal combining means comprises an electronic circuit which produces said dirtiness indicator signal.

8. An apparatus according to claim 7, wherein the electronic circuit includes an iteration circuit which counts the number of occurrences when said dirtiness indicator signal is produced and which triggers a dirtiness indicator after a selected number of said occurrences.

9. An apparatus according to claim 7, wherein each of the sensors produces an output signal when the internal combustion engine is under partial load, and the electronic circuit comprises an extrapolation circuit which determines a reduction of air throughput through the filter at full load due to dirtiness of the filter.

* * * * *